United States Patent [19]

Iwasaki et al.

[11] Patent Number: 5,140,212
[45] Date of Patent: Aug. 18, 1992

[54] DIAPHRAGM ELECTROMAGNETIC DRIVE DEVICE

[75] Inventors: Hiroyuki Iwasaki; Yasunobu Kayanuma, both of Tokyo, Japan

[73] Assignee: Fuji Photo Film Co., Ltd., Kanagawa, Japan

[21] Appl. No.: 611,635

[22] Filed: Nov. 13, 1990

[30] Foreign Application Priority Data

Nov. 16, 1989 [JP] Japan .................. 1-298374
Feb. 13, 1990 [JP] Japan .................. 2-32177

[51] Int. Cl.$^5$ .................. H02K 1/27; H02K 21/12; B03B 9/02
[52] U.S. Cl. .................. 310/191; 310/156; 310/267; 354/271.1; 354/274
[58] Field of Search .................. 310/191, 267, 235, 266, 310/254, 156, 261, 90; 350/269, 449, 450; 354/234.1, 235.1, 271.1, 274; 355/34, 36, 71

[56] References Cited

U.S. PATENT DOCUMENTS

| | | | |
|---|---|---|---|
| 2,141,681 | 12/1938 | Brueck | 116/124 |
| 4,045,696 | 8/1977 | Lutz et al. | 310/49 R |
| 4,047,807 | 9/1977 | Okano et al. | 350/266 |
| 4,378,146 | 3/1983 | Suzuki et al. | 350/269 |
| 4,390,262 | 6/1983 | Hirohata et al. | 354/230 |
| 4,460,253 | 7/1984 | Kawai et al. | 354/446 |
| 4,491,401 | 1/1985 | Inaba et al. | 354/271.1 |
| 4,601,564 | 7/1986 | Yamamoto | 354/271.1 |
| 4,731,626 | 3/1988 | Kawamoto | 354/271.1 |
| 4,763,150 | 8/1988 | Sumi | 354/271.1 |
| 4,984,972 | 1/1991 | Clausen et al. | 417/420 |

*Primary Examiner*—Steven L. Stephan
*Assistant Examiner*—Dennis R. Haszko
*Attorney, Agent, or Firm*—Sughrue, Mion, Zinn Macpeak & Seas

[57] ABSTRACT

A diaphragm electromagnetic drive device which comprises ring-shaped rotor and stator disposed coaxially about the optical axis of a taking lens and in which the rotor is rotated to thereby rotate diaphragm blades so as to vary successively a diaphragm diameter defined by the diaphragm blades. The mutually opposed surfaces of the rotor and stator are constructed respectively in the shape of a side surface of a truncated cone, so that the areas of the opposed surfaces can be increased without increasing the outside diameter and the length in the optical axis direction of the electromagnetic drive device.

1 Claim, 5 Drawing Sheets

DIAPHRAGM ELECTROMAGNETIC DRIVE DEVICE

BACKGROUND OF THE INVENTION

1. Field of the Invention

The present invention relates to a diaphragm electromagnetic drive device and, in particular, to a diaphragm electromagnetic drive device which is able to change the diaphragm diameter of a diaphragm blade according to the rotational positions of a rotor to be magnetically driven.

2. Description of the Related Art

Conventionally, a diaphragm electromagnetic drive device of the above-mentioned type comprises hollow and disc-shaped rotor and stator respectively disposed coaxially with the optical axis of a taking lens, in which the opposed surfaces of the rotor and stator are respectively perpendicular to the optical axis of the taking lens (which is hereinafter referred to as an electronic drive device of an opposed discs type) (see Japanese Patent Publication No. 60-11337).

Also, as another conventional diaphragm electromagnetic drive device, there is known a device which comprises cylindrical rotor and stator disposed coaxially with the optical lens of a taking lens, with the opposed surfaces of the rotor and stator being parallel to the optical axis of the taking lens (which is hereinafter referred to as an electronic drive device of an opposed cylinders type)(see Publication of Japanese Patent Application Laid-open No. 1-120542).

However, in the above-mentioned conventional opposed discs type electromagnetic drive device, if the areas of the opposed surfaces of the rotor and stator are increased, that is, the effective areas of a magnet and a coil are increased in order to secure a desired electromagnetic force, then the outside diameter of the electromagnetic drive device is increased, which provides a drawback. Similarly, in the opposed cylinders type electromagnetic drive device, if the effective areas of a magnet and a coil are increased, then the length of the electromagnetic drive device in the optical axis direction thereof, which also provides another drawback.

Also, in the opposed discs type electromagnetic drive device, there is interposed a ball between the rotor and stator and the rotor can be rotatably supported by means of a binding force produced due to relative attraction between the rotor and stator, but too a strong force is applied to the ball because all of the binding force due to such relative attraction is applied to the ball. On the other hand, in the opposed cylinders type electromagnetic drive device, there is required a member to restrict the rotor in the optical direction in order to support the rotor rotatably, and it is complicated and troublesome to adjust the amount of contact of the ball and to align the ball with the optical axis. In addition, the electromagnetic drive device of the opposed cylinders type requires a large number of parts and is difficult to assemble.

SUMMARY OF THE INVENTION

The present invention aims at eliminating the drawbacks found in the above-mentioned prior art devices.

Accordingly, it is an object of the invention to provide a diaphragm electromagnetic device which can increase the effective areas of a magnet and a coil, can achieve a simplified structure and can provide improved assembly.

In order to achieve the above object, according to the invention, there is provided a diaphragm electromagnetic drive device which comprises ring-shaped rotor and stator disposed coaxially about the optical axis of a taking lens and which is adapted to be able to change the diaphragm diameter of a diaphragm blade in accordance with the rotational positions of a rotor to be electromagnetically driven, characterized in that the mutually opposed surfaces of the rotor and stator are constructed in the shape of a side surface of a truncated cone, respectively.

Also, according to another aspect of the present invention, there are provided V-shaped grooves and inclined surfaces in the rotor and stator, respectively, and there are interposed a plurality of balls between the V-shaped grooves or between the V-shaped grooves and the inclined surfaces.

According to the invention, due to the fact that the respective opposed surfaces of the rotor and stator are constructed in the shape of a side surface of a truncated cone, when the areas of such opposed surfaces are equal to each other, that is, when the effective area of the magnet is equal to that of the coil, the outside diameter of the present electromagnetic drive device can be reduced over that of the conventional opposed discs type electromagnetic drive device, and at the same time the length of the present electromagnetic drive device can be made shorter (or thinner) in the optical axis direction than that of the conventional opposed cylinders type electromagnetic drive device. Also, according to the invention, the rotor can be retained and the position of the rotor can be restricted by an attracting force produced between the rotor and stator. Further, according to the invention, due to the fact that a component force of such attracting force in the optical axis direction is applied to the ball, the force to be applied to the ball can be reduced over the prior art devices.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a diaphragm electromagnetic drive device according to the present invention with reference to the accompanying drawings.

Figure 1:
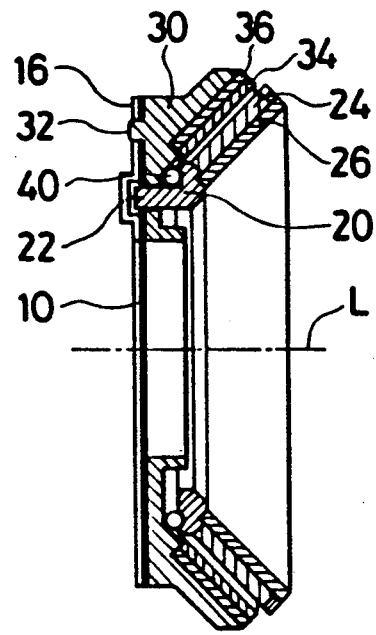
FIG. 1 is a section view of an embodiment of a diaphragm electromagnetic drive device according to the invention.
Figure 2:
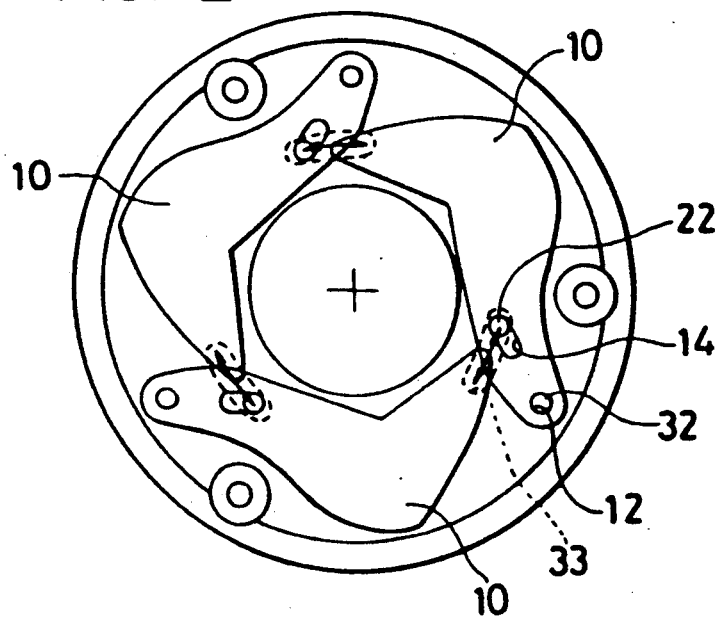
FIG. 2 is a front view of main portions of the diaphragm electromagnetic drive device shown in FIG. 1.

As shown in FIGS. 1 and 2, an electromagnetic drive device, which is used to vary the diaphragm diameter of an iris diaphragm composed of three diaphragm blades 10, consists mainly of a rotor 20 and a stator 30.

Figure 3:
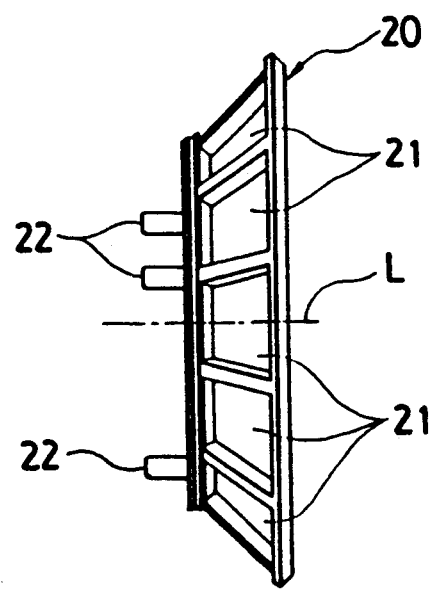
FIG. 3 is a side view of a main body portion of a rotor employed in the above embodiment in FIG. 1.

The above-mentioned rotor 20 and stator 30 have their own main body portions which are respectively molded and machined in a ring-like shape out of a nonmagnetic material and also are disposed coaxially about an optical axis L of a taking lens (not shown). The main body portion of the stator 30 includes support dowels 32 respectively formed integrally therewith for rotatably supporting the diaphragm blades 10 respectively. Also, the main body portion of the rotor 20, as shown in FIG. 3, includes drive dowels 22 respectively formed integrally therewith for applying rotational drive forces to the diaphragm blades respectively and also magnet positioning openings 21 respectively formed integrally therewith for incorporating magnets 24 which will be discussed afterwards. Due to this, the number of parts can be reduced and the present drive device is easier to assemble. It should be noted here that the above-mentioned drive dowel 22 is projected out through an elongated bore 33 formed in the stator 30 in the circumferential direction thereof so as to be substantially level with the above-mentioned support dowel 32.

In each of the diaphragm blades 10, there are formed a support hole 12 and a drive groove 14. Each of the diaphragm blades 10 is mounted in such a manner that, after the support hole 12 and drive groove 14 there are inserted into the support dowel 32 of the stator 30 and the drive dowel 22 of the rotor 20, respectively, it can be retained by a blade retain plate 16 and thus it is prevented from moving out of the respective dowels.

Now, in the mutually opposed surfaces of the rotor 20 and stator 30, there are disposed a magnet 24 and a coil 34 which are respectively inclined with respect to the optical axis L. Here, to mount the magnet 24 to the rotor 20 can be achieved by incorporating a plurality of divided magnets 24 into the magnet positioning openings 21 respectively. In other words, in spite of the fact that it is difficult for a sintered magnet and the like to be formed in a conical shape, use of the above-mentioned method makes it easy to form and mount such magnet.

In the above-mentioned manner, the mutually opposed surfaces of the rotor 20 and stator 30 can be respectively constructed in the shape of a side surface of a truncated cone, which allows the increased effective areas of the magnet 24 and coil 34. In the drawings, reference numerals 26 and 36 represent a yoke, respectively.

Therefore, by controlling the energization to the coil 34 of the stator 30, the rotor 20 can be rotated by means of an electromagnetic force generated between the coil 34 and the magnet 24. And, when the drive dowel 22 is rotated in a direction of an arrow in FIG. 2 with the rotation of the rotor, then the diaphragm blades 10 are rotated about the support dowels 32, respectively, which varies the diaphragm diameter formed by the respective diaphragm blades 10.

Next, description will be given below of a rotor support structure employed in the above-mentioned diaphragm electromagnetic drive device and how to assemble the rotor support structure.

Figure 4:
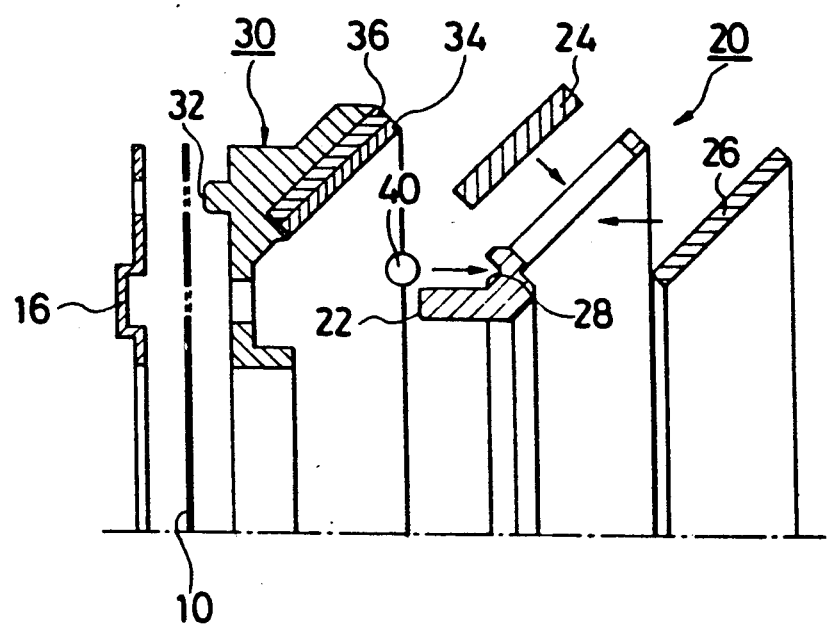
FIGS. 4 and 5 are semi-section views respectively used to illustrate how to construct and assemble a rotor support mechanism employed in the diaphragm drive device shown in FIG. 1, respectively showing the states of the rotor support mechanism before assembled and after assembled.
Figure 5:
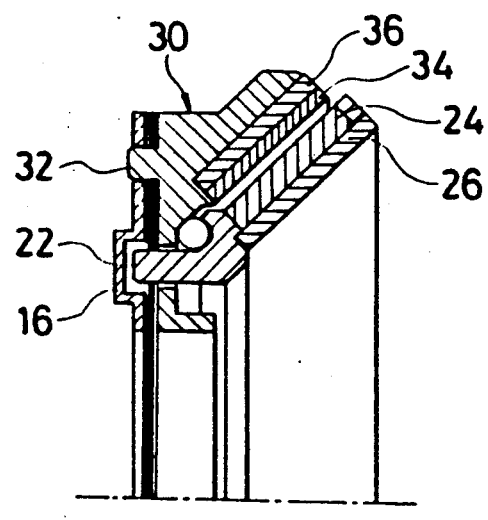

FIGS. 4 and 5 are partial section views which respectively shows the states of the above-mentioned diaphragm electromagnetic drive devices before and after assembled. As shown in these figures, in the rotor 20, there is formed a V-shaped groove 28 for receiving a ball and, in the stator 30, there is formed an inclined surface for receiving a ball. Here, the magnet 24 and yoke 26 are fixed through the rotor 20 by their own forces.

In assembly, the ball 40 is put on the ball receiving V-shaped groove 28 formed in the rotor 20 and then the stator 30 is placed over the ball 40 and V-shaped groove 28. The rotor 20 and stator 30 attract each other in the optical axis direction by means of their magnetic forces and the rotor 20 is aligned automatically by the V-shaped groove V and inclined surface 38.

In other words, use of the attracting force by the magnetic forces can eliminate the need for a rotor support means and also the need to adjust the degree of contact of the ball 40.

Next, the diaphragm blade 10 is incorporated into the above magnetic drive device a described before, the drive space of the diaphragm blade 10 is secured by as projected portion provided in the stator 30, and the diaphragm retain plate 16 is then fixed, which completes the assembly of the diaphragm electromagnetic drive device.

Figure 6:
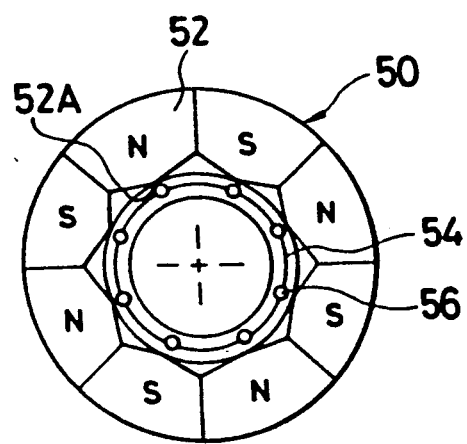
FIG. 6 is a plan view of an embodiment of a rotor employed in the above electromagnetic drive device; and, FIG. 7 and 8 are respectively section views of another embodiments of a diaphragm electromagnetic drive device according to the invention.

Now, in FIG. 6, there is shown a front view of an embodiment of a rotor employed in the above-mentioned electromagnetic drive device. The rotor 50 has a magnet 52 comprising multiple poles and, in each of the poles, there is provided a projecting portion 52A which is extending toward the ball receiving V-shaped groove 54 and on which leakage fluxes are centered.

Thanks to this, in assembly, simply by putting balls 56 of steel into V-shaped grooves 54 adjacent to the respective projecting portions 52A, the balls can be arranged and retained substantially at an equal interval from one another by means of a magnetic force.

In other words, in a conventional ordinary ball bearing, when a large number of balls are not arranged in a circumferential manner at some distances from one another, retainers are interposed between the balls so that the balls can be arranged substantially at an equal interval from one another. In contrast with this, use of the magnet 52 constructed in the above-mentioned manner can eliminate the need for provision of the retainers.

Figure 7:
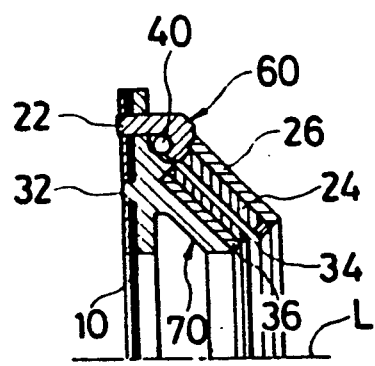

Referring now to FIG. 7, there is shown a section view of another embodiment of a diaphragm electromagnetic drive device according to the invention. In this figure, parts having the same function as in the electromagnetic drive device shown in FIG. 1 are given the same designations and the detailed description thereof is omitted here.

Figure 8:
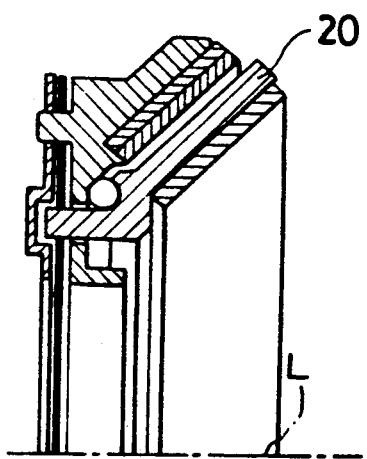

The electromagnetic drive device in FIG. 7 is different from that in FIG. 1 mainly in that the inclined direction of the mutually opposed surfaces of a rotor 60 and a stator 70 are reversed, and that the stator 70 is disposed inside of the rotor 60. In FIG. 8, there is shown an embodiment in which a magnet is formed integrally with the rotor 20. This embodiment can reduce the number of parts required and also can facilitate the assembling of the electromagnetic drive device to a great extent.

As has been described heretofore, in a diaphragm electromagnetic drive device according to the invention, the effective areas of the magnet and coil can be increased, which allows the device to be made compact. That is, the outside diameter of the present electromagnetic drive device can be decreased over that of the conventional opposed discs type electromagnetic drive device, and the thickness of the present device can be made thinner than that of the conventional opposed cylinders type electromagnetic drive device. Also, due to the fact that the rotor can be retained and the position of the rotor can be restricted by use of the magnetic force of the magnet, there is eliminated the need for extra retaining members, thereby reducing the number of parts required and the number of man-hour required for assembling. In addition, since the component force of the magnet attracting force in the optical axis is smaller than the attracting force, the loads required for receiving the balls are smaller than those in the conventional opposed discs type of electromagnetic drive device.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A diaphragm electromagnetic drive device comprising a ring-shaped rotor and a ring-shaped stator disposed coaxially about the optical axis of a taking lens and capable of varying a diaphragm diameter defined by a plurality of diaphragm blades in accordance with the rotational positions of said rotor to be driven electromagnetically, wherein the mutually opposed surfaces of said rotor and stator are respectively constructed in the shape of a side surface of a truncated cone, wherein a ball receiving V-shaped groove and a ball receiving inclined surface are formed in said rotor and stator respectively, and a plurality of balls are interposed between said V-shaped groove and said inclined surface to thereby form a ball bearing, and wherein said rotor main body portion includes therein a magnet having multiple poles and in the respective poles of said magnet there are provided projecting portions which respectively extend toward said plurality of balls and in which leakage fluxes are centered.

* * * * *